United States Patent Office 3,698,912
Patented Oct. 17, 1972

3,698,912
PROCESS FOR MAKING NUTRIENT
COMPOSITION
Milton Winitz, Palo Alto, Calif., assignor to Morton-Norwich Products, Inc., Chicago, Ill.
No Drawing. Continuation-in-part of abandoned application Ser. No. 705,299, Feb. 14, 1968. This application July 1, 1969, Ser. No. 838,338
Int. Cl. A23l 1/42
U.S. Cl. 99—14　　　　　　　　　　　　　　　23 Claims

ABSTRACT OF THE DISCLOSURE

A process for making palatable nutrient compositions for human consumption which contain all of the essential amino acids plus non-essential amino acids in nutritionally balanced relationship. Aqueous solutions of acid- or enzyme-hydrolyzed proteins provide a starting point for the process.

---

This application is a continuation-in-part of my application Ser. No. 705,299, filed Feb. 14, 1968, now abandoned.

This invention relates to amino acid formulations designed for human consumption to supply essential amino acid requirements, and more particularly to processes for making palatable amino acid formulations from protein hydrolysates.

Proteins are high molecular weight, highly complex polymers composed of a variety of the so-called essential and non-essential amino acids. Utilization of protein by the animal organism requires that the protein be degraded by the proteolytic enzymes of the gastrointestinal tract to the constituent individual amino acids because the amino acids can be absorbed through the gastrointestinal tract only in the free, uncombined form. The essential amino acids, of which there are considered to be ten in number (leucine, isoleucine, valine, methionine, tryptophan, phenylalanine, threonine, arginine, lysine, histidine), are a vital requirement of the animal species. For a dietary regimen to be considered adequate for the support of all normal physiological functions, it should contain these essential amino acids in the appropriate levels and in the proper proportion of one to the others. The function of the non-essential amino acids is to provide a source of metabolizable nitrogen required by the animal organism for the biosynthesis of proteins, purines, nucleic acids, and other metabolites. Examples of non-essential amino acids include alanine, cysteine, cystine, glycine, proline, glutamic acid, tyrosine, aspartic acid, and serine. Proper nutritional balance requires that these non-essential amino acids be provided in sufficient quantity and within a range of proportions to each other that is less restrictive or critical than the balance required for the essential amino acids.

Amino acids (except glycine) contain one or more asymmetric centers and thus may exist in two or more stereoisomeric forms. Nutritional experience has shown that only the L-isomer of an amino acid can be utilized by the animal organism and that the animal organism has only a vey limited capacity for enzymatically converting some amino acids to the L form from the D form. In addition, an over-supply of D-amino acids can be deleterious and can lead to an inhibition of the normal physiological function. All proteins found in nature contain their constituent amino acids in the L configuration only.

This invention is concerned with processes for the preparation of palatable and nutritionally balanced protein hydrolysates for nutritional support of humans and suitable for admixture with other nutritional ingredients such as carbohydrates, minerals, vitamins and fats. Synthetic foodstuffs containing such protein hydrolysates are of particular use in the nutritional support of infants who possess food allergies, of people who cannot chew because of oral surgery, of patients who are unable to digest proteins because of pancreatic insufficiency or other gastrointestinal conditions which impede protein digestion, of patients who must be fed via naso-gastric tube, and of people who suffer from severe protein malnutrition. In the formulation of such synthetic foodstuffs containing protein hydrolysates, it is necessary to ensure that they possess both a high degree of nutritional adequacy and are sufficiently palatable to the human taste to permit their ingestion over a prolonged period of time.

Since the turn of the century, a good deal of research has been directed toward the development of an amino acid-based dietary regimen that would be both nutritionally balanced and palatable to the human. Such efforts were concerned almost exclusively with the use of protein hydrolysates as the source of amino acids. (Protein hydrolysates are mixtures of amino acids derived through hydrolysis of proteins, e.g., casein, lactalbumin, soy bean protein, by employing alkali, a strong mineral acid, or a proteolytic enzyme as the hydrolytic agent). Amino acid-based diets prepared with such protein hydrolysates have invariably been found to possess highly objectionable taste properties, which classically have been erroneously attributed to the amino acids themselves, rather than to certain degradation products which arise during the process of hydrolyzing proteins.

It has been found that the palatability of amino acid mixtures can be significantly enhanced if the concentrations of certain of the components in these mixtures are kept below certain levels. These components include glutamic acid and its salts, the sulfhydryl group of certain amino acids, and the lower alkyl mercaptans which are associated with or arise from the degradation of methionine.

It is an object of the present invention to provide a process for preparing palatable nutrient compositions using protein hydrolysates as the starting materials. It is a further object to provide simple and expedient processes for utilizing readily available protein hydrolysates in the formation of palatable aqueous solutions or dry mixtures containing balanced amounts of all of the essential amino acids plus non-essential amino acids. These and other objects of the invention will be apparent from the following detailed description of processes embodying various features of the invention.

It has been found that a formulation containing amino acids is unpalatable if it contains lower alkyl mercaptans, such as methyl mercaptan, in such a total amount that an aqueous solution of the formulation would have a concentration greater than about 15 milligrams of such mercaptans per liter of solution, when the pH of the solution is about 3.7. The tolerance level decreases slighaly with increasing pH, with the tolerable concentration being about 7.5 mg./liter at a pH of about 5.7. It has also been found that the sulfhydryl group of the amino acid cysteine likewise detracts from palatability, and there should not be present a sulfhydryl group concentration greater than about 0.05 gram per liter of solution at a pH of about 5.7. The tolerable sulfhydryl concentration decreases at lower pH's, and at a pH of about 3.7 it is about 0.038 g./liter. It has further been found that glutamic acid, or the salts thereof, imparts a strong characteristic flavor to an amino acid formulation, which flavor can render a formulation unpalatable. The flavor is also incompatible with the taste of the other ingredients likely to be used in chemical diets and renders the entire diet formulation unpalatable if it is present in an amount of more than about 1.43 grams per liter. The present invention provides processes in which protein hydrolysates containing some or all of the palatability offenders listed above are treated to expeditiously accomplish the removal of such offenders and replace them at least in part with nutritionally equivalent non-offensive components and thereby provide nutritionally balanced amino acid formulations.

In accordance with this general process, the protein hydbrolysates which are employed may be prepared from, and preferably are prepared from, fairly abundant high-quality proteins, such as casein, lactalbumin, soybean protein, fish protein and bacterially produced protein from petroleum and the like. However, other suitable proteins may also be used, such as gelatin, egg albumin, whole blood protein, wheat gluten and zein, for example. Moreover, if desired, mixtures of more than one protein may be employed. As a starting material, one may hydrolyze protein with a mineral acid or by means of proteolytic enzymes to form a mixture of amino acids wherein the amino acids are almost exclusively of the L-configuration, with little or no D-amino acids. Alternatively, one may employ acid or enzymatic hydrolysates of protein which are commercially available.

Briefly, after an aqueous solution of the protein is formed substantially all of the following amino acids are removed from the solution: tyrsoine, cystine, aspartic acid and glutamic acid. These four amino acids may be removed in any order, and if the particular protein hydrolysate being treated should not contain one or more of these amino acids, or should contain one or more of these amino acids in only very minor amount, provision for removing such an amino acid need not be made. The cystine and tyrosine may be removed separately but it is preferred that they be removed together. This pair of acids are preferably precipitated from the main hydrolysate solution while it is maintained at a temperature below about 50° C. and a pH between about 5 and 7. It is also preferred to remove the glutamic acid and aspartic acid together, and these two amino acids are preferably removed by adsorption onto anion exchange resins. Removal of these four amino acids as pairs of two provides a preferred, simple and expedient method of removing these components from the main hydrolysate solution, which may then be treated as a unit in preparing it to serve as the base of a palatable amino acid formulation adapted for human consumption.

One pair of amino acids, i.e., tyrosine and cystine, which are preferably removed together includes a major contributor to unpalatability, i.e., cystine, and also includes a non-essential amino acid of limited water solubility, i.e., tyrosine. The other pair of amino acids that are preferably removed together includes another palatability offender, i.e., glutamic acid, as indicated hereinbefore, and another non-essential amino acid of limited solubility in water, i.e., aspartic acid. Removal of glutamic acid facilitates its elimination or reduction in the final product.

Following removal of substantially all of the aspartic acid, tyrosine, glutamic acid and cystine from the protein hydrolysate solution, water-soluble forms of these components, or of nutritional equivalents thereof are added to the hydrolysate solution, or to the dry mixture of amino acids remaining after evaporation of the hydrolysate solution to dryness, to alleviate the deficiency that now exists because of their absence. Tyrosine and aspartic acid are preferably supplied to the hydrolysate solution or to the dry mixture in forms having a water solubility at least equal to that of leucine. It is preferred that the tyrosine which was recovered from the protein hydrolysate solution is converted to a water-soluble tyrosine derivative (preferably tyrosine ethyl ester hydrochloride), that the aspartic acid is converted to a water-soluble salt, such as a sodium salt, and that these water-soluble components are then returned to the main protein hydrolysate solution or to the dried counterpart thereof. Of course, these two amino acids need not be returned to the same protein hydrolysate from which they were removed or in precisely the same amounts because water-soluble L-isomers of these two amino acids are commercially available today. However, there are economic advantages to covnerting and returning the removed components, and this is the preferred method of operation.

In amino acid formulations which are designed to provide all of the metabolic requirements for nitrogen, and in diet compositions employing such amino acid formulations which compositions might be used, for example, as the sole daily source of nutrition, the balance among the various amino acids should be suih as to meet the normal metabolic needs of the human subject and to maintain the desired nitrogen balance. There are strong interdependencies between the required levels of any given amino acid and of one or more of the other amino acids. It is well known that various of the non-essential amino acids can be used to partially supply a portion of essential amino acid requirements, and vice-versa, essential amino acids can be provided in lieu of certain non-essential amino acids to perform the same nutritional function.

Inasmuch as naturally occurring proteins of high quality, such as meat, eggs, milk and certain grains, include the essential and non-essential amino acids in suitably balanced relationships to one another to satisfy human nutritional requirements, amino acid formulations made from protein hydrolysates are considered generally to be adequate to supply the metabolic nitrogen needs of the human species if they approximate the amino acid balances of these proteins and contain these amino acids in the L-isomer form.

In the preferred process, the tyrosine and aspartic acid which are removed from the main protein hydrolysate are returned thereto in at least substantially quantitative amounts, and an additional amount may be added if desired. An equivalent amount of L-glutamine, which is nutritionally equivalent to glutamic acid, is added to the protein hydrolysate to replace the glutamic acid removed; however, if desired, a portion of the removed glutamic acid may be recovered and returned so long as the level of glutamic acid (or its salts) would remain below the aforementioned limit in the intended product. Similarly, additional purified L-methionine, which is nutritionally equivalent to and can be substituted for cystine, is preferably added to the main protein hydrolysate solution or to the dry mixture of amino acids obtained therefrom, as a replacement for the cystine that was removed. Likewise, if desired, a small portion of the cystine might be returned so long as the sulfhydryl concentration of the intended solution would not exceed the aforementioned limits. Furthermore, because tryptophan, if present in the protein used, is destroyed in an acid hydrolysis process, purified L-tryptophan is added to the main solution or to the dry mixture of amino acids obtained therefrom, as a replacement therefor.

Before the addition or return of amino acids to the protein hydrolysate containing the majority of the amino acids from the protein, it may be further treated to assure its freedom from impurities and contaminants which may result as a matter of course from the hydrolysis process. Purification in this manner may be rather simply carried out by boiling the main solution for about one minute after adding adsorptive activated carbon and filtering the carbon from the solution while it is still hot. Purification should be such as to assure the removal of substantially all of the lower alkyl mercaptans, in accordance with the limits set forth hereinbefore.

To facilitate dissolution into the main protein hydrolysate solution of methionine, which is preferably added to replace the cystine that is removed, the solution is preferably maintained at an elevated temperature, i.e., above about 70° C. However, when the protein hydrolysate solution contains tryptophan, a lower temperature plus vigorous stirring are preferably used. The water-soluble salts of tyrosine and aspartic acid may also easily be added at the elevated temperature if desired. However, methionine is subject to thermal degradation that produces lower alkyl mercaptans, particularly methyl mercaptan, which as previously indicated can ruin the palatability of a solution. Accordingly, the solution should not be kept at an elevated temperature for any substantial length of time after the dissolution of methionine, and it is preferable to cool the solution immediately after the dissolution of methionine. Glutamine is preferably not added to the solution at temperatures above about 70° C., and thus is usually dissolved therein after cooling of the solution has been effected when a resultant liquid product is desired. When a dry formulation is being prepared, the glutamine is usually added by blending after the protein hydrolysate has been dried.

Generally, it is desirable to administer these amino acids as a part of a more complete dietary composition including at least a carbohydrate component, particularly a monosaccharide, disaccharide, dextrin, starch, or mixtures of any of the foregoing. It has been found that the favorable endothermic heat of solution of such carbohydrates, for example glucose, can be employed to achieve the desired temperature lowering of the solution prior to the addition of tryptophan and glutamine, while concurrently accomplishing dissolution of a substantial portion of such a carbohydrate component in the aqueous solution at a temperature where its solubility is relatively high, when it is the intention to produce a product in resultant form.

There is one further consideration, however. If the carbohydrate is employed to accomplish the lowering of the temperature, as it preferably is, interaction may occur at elevated temperatures between the amino acids, particularly lysine, and aldehyde or ketone groups which may be present in the carbohydrate component, for example, glucose (or potential aldehyde groups of a glucose-containing polymer that is subject to hydrolysis). Such chemical interaction results in the formation of undesirable condensation products which are brown in color and which have a flavor resembling caramel. Precautions should be taken to minimize the extent of the time-temperature integral over which amino acids and such carbohydrates are both present in the solution in order to thereby minimize the extent of caramelization that may occur. This objective is achieved by adding the carbohydrate sufficiently rapidly while agitating the solution to enhance its dissolution. In this respect, the addition of the carbohydrate component, particularly glucose, should be sufficiently rapid to drop the temperature to about 40° C. within ten minutes from the initial addition. Not only does rapid dissolution avoid possible unpalatability resulting from interaction between amino acids and aldehyde groups of the carbohydrate, but it also reduces the time at which the methionine is exposed to the relatively high temperatures. Carbohydrates may be employed in various forms, but glucose, maltose, sucrose, lactose, fructose, starches, dextrins or mixtures thereof, are usually used.

Although the discussion in this application is confined to the production, from protein hydrolysates, of palatable aqueous solutions or dry mixtures containing all the necessary essential and non-essential amino acids for human nutrition, and also including a suitable carbohydrate component, such as glucose, and although it might be desirable for certain purposes to administer such a composition in this form, these amino acid formulations can be very advantageously used in the production of complete dietary compositions which provide all of the nutritional needs for the human subject when taken as the sole source of nutrient intake for days, weeks, or even months. Compositions of this type will normally include, in addition to the carbohydrate and amino acids mentioned, sources of minerals, vitamins and essential fat. Amino acid formulations made by the processes described herein are considered excellently suitable for the subsequent formulation of such complete dietary compositions.

In the formulation of complete dietary compositions which provide all of the nutritional needs for the human subject when taken as a sole source of nutrient for days, weeks or months it is desirable to add to the protein hydrolysate, after the removal of aspartic acid, tyrosine, glutamic acid, and cystine, the following nutrients either singly or in combination: minerals in the form of the mineral salts of sodium, potassium, magnesium, calcium, manganese, zinc, copper, iron, cobalt, iodine, phosphorus, chlorine and/or molybdenum; water-soluble and/or fat-soluble vitamins such as vitamin A, vitamin $B_{12}$, vitamin C. vitamin D, vitamin E, para-aminobenzoic acid, biotin, pantothenic acid, inositol, niacin, pyridoxine, riboflavin, thiamine and/or materials with equivalent vitamin activty; fats, such as safflower oil, corn oil, ethyl linoleate and/or equivalent fat substances; a source of carbohydrate as indicated hereinbefore; and/or any one of the amino acids or a combination of amino acids necessary to achieve a well-balanced dietary composition.

The following examples are directed to the preparation of palatable amino acid-containing formulations and are chosen to illustrate various aspects of the invention. It should be understood that these examples are provided for the purpose of illustration and do not constitute limitations on the scope of the invention which is defined solely by the claims at the end of this specification.

EXAMPLE I

Sixty grams of casein are suspended in 300 milliliters of concentrated hydrochloric acid in a glass bottle, and the bottle is placed in an autoclave for about five hours at about 120° C. The resultant hydrolysate is concentrated to a thick syrup under reduced pressure, and the excess ·HCl is removed by evaporation twice, after the addition each time of about 75 milliliters of water. The final residue is dissolved in 150 ml. of hot distilled water, treated with Norit (a highly absorptive activated carbon) and then filtered while hot. The filtrate is evaporated in vacuo to a thick syrup. A more dilute aqueous solution is formed by the addition of about 500 ml. of water to the residue, and this solution is then treated with concentrated ammonium hydroxide to a pH of about 5. The resultant solution is chilled to about 4° C. and maintained at that temperature for about twenty-four hours. Under these conditions the cystine and tyrosine precipitate from the solution. The precipitate is filtered using suction, and the filtrate is saved. The precipitate is then washed with a small amount of warm water, which water is added to the filtrate.

The filtrate plus wash water is evaporated to dryness under about one-half atmosphere pressure, and the residue is dissolved in water. Pre-treated Amberlite IRA resin (a strong base-type anion exchange resin) is added, while stirring, until the pH of the solution reaches about 6.5. The Amberlite IRA resin is pre-treated successively with ·HCl, water, sodium carbonate, and water again. The resin is filtered from the solution, and the filtrate acidified using hydrochloric acid to a pH of about 2.8. The acidified filtrate is again treated with a sufficient fresh resin to bring the pH to about 6.5. The resin is again filtered from the solution, and the two resin portions are combined. The aspartic acid and the glutamic acid are adsorbed onto the resin.

The filtrate is heated to boiling, Norit is added, and the solution is filtered while hot. The volume of the solution is adjusted to 400 milliliters by either the addition of an appropriate amount of water or by evaporation. This solution contains the following amino acids from the protein: threonine, isoleucine, leucine, lysine, methionine, phenylalanine, valine, arginine, histidine, alanine, glycine, proline and serine.

The combined cystine-tyrosine precipitate is dissolved in a minimal amount of aqueous ten percent ammonium hydroxide at a temperature of about 95° C. After dissolution of the precipitate, the solution is chilled to a temperature of about 4° C. and maintained there at that temperature for several hours. Under these conditions, tyrosine precipitates from the solution. The precipitate is filtered from the solution and then washed successively with cold aqueous 10 percent ammonium hydroxide and cold water. The washed precipitate is dried under vacuum and then suspended in 30 ml. of absolute ethanol. The suspension is saturated with dry hydrogen chloride gas, and the resulting solution is permitted to stand for about sixteen hours at room temperature. The solution is evaporated to dryness under vacuum, and 30 ml. of absolute ethanol is added to the resulting residue. The evaporation is repeated, and the residue which is now in the form of tyrosine ethyl ester hydrochloride is dissolved in hot ethanol. The solution is treated with Norit and filtered. The filtrate is evaporated to dryness under reduced pressure of about one-half atmosphere. The residue is recrystallized from an ethanol-ether mixture and yields 3.7 grams of pure L-tyrosine ethyl ester hydrochloride.

The combined ion exchange resin portions are extracted with 1.0 N ·HCl until the pH of the extract is less than 2. The extracts are treated with Norit, filtered and evaporated to a low bulk. The solution is then saturated with dry hydrogen chloride gas, and chilled to a temperature of about 0° C. whereat the glutamic acid precipitates in the form of L-glutamic acid ·HCl. The filtrate from these crystals is evaporated in vacuo to a syrup to remove excess hydrochloric acid, diluted with water and then boiled. It is then treated with an excess of copper carbonate, and the excess is filtered while the solution is still hot. Upon cooling to room temperature, the blue copper salt of L-aspartic acid crystallizes in substantially quantitative yield. This salt is then suspended in water and treated with hydrogen sulfide gas. The resultant copper sulfide is filtered from the solution with the aid of Norit, and the filtrate is evaporated to a low bulk. Ethanol in an amount about four times the volume of the solution is added, which causes the precipitation of L-aspartic acid. A yield of approximately 3.6 grams of L-aspartic acid is obtained, which is then converted to the sodium salt thereof by dissolution in 30 ml. of distilled water containing 1.1 grams of sodium hydroxide.

The 400 ml. volume main solution containing the majority of amino acids is heated to 90° C. Successively added thereto are the sodium L-aspartate solution, the 3.7 grams of L-tyrosine ethyl ester hydrochloride, plus one gram of pure L-methionine, stirring being employed continuously to facilitate dissolution.

The heat is removed and the solution is rapidly cooled to 40° C. or below by the addition of about 400 grams of glucose, in increments of about 50 grams each, using continuous stirring to facilitate dissolution. Under these conditions, the temperature reaches 40° C. about ten minutes subsequent to the initial addition of glucose. Upon dissolution of all of the glucose, 0.84 gram of L-tryptophan is added. Subsequent to complete dissolution of the tryptophan, 6.1 grams of L-glutamine are dissolved in the solution.

Analysis of the solution shows that amino acids are contained therein in approximately the following amounts: L-trypthophan 0.84 g., L-threonine 2.3 g., L-isoleucine 3.5 g., L-leucine 5.3 g., L-lysine 4.2 g., L-methionine 2.6 g., L-phenylalanine 2.9 g., L-tyrosine ethyl ester hydrochloride 3.7 g., L-valine 3.9 g., L-arginine 2.2 g., L-aspartic acid 3.6 g., L-glutamine 6.1 g., L-histidine 1.6 g., L-alanine 1.8 g., glycine 1.1 g., L-proline 6.2 g., and L-serine 3.5 g.

The above analysis shows that substantially quantitative yields of most of the amino acids are obtained from the 60 grams of casein that were hydrolyzed, with the exception of cystine, glutamic acid and tryptophan. The solution is fairly clear, and tasting shows that although it exhibits a relatively sweet taste characteristic of the glucose, it is clearly palatable to the human taste. The formulation is considered to be excellently suited to provide a complete chemical nutrient composition for the human species by the addition to the solution of additional carbohydrate and appropriate amounts of vitamins, minerals, and fat.

EXAMPLE II

Sixty grams of lactalbumin hydrolysate (acid hydrolyzed) is dissolved in one liter of hot water. The solution is cooled to room temperature, and the pH there is adjusted to about 2.8 by the addition of sufficient concentrated hydrochloric acid. To this solution is added Amberlite IR4 resin (an anion exchange resin of the weak base-type), while stirring, until the pH of the solution reaches about 6.5. The ion exchange resin is pre-treated by successive treatments of hydrochloric acid, water, sodium carbonate, and water. The resin is filtered from the solution, and the filtrate is acidified with hydrochloric acid to a pH of about 2.8. The acidified filtrate is treated again with fresh ion exchange resin until the solution reaches a pH of about 6.5. The resin is again filtered from the solution, and the two resin portions are combined.

The filtrate is chilled to about 4° C. and maintained at that temperature for about twenty-four hours. Under these conditions, cystine and tyrosine precipitate from the solution. The solution is filtered from the precipitate using suction. The precipitate is washed with a small amount of warm water, and the wash water is combined with the filtrate.

The filtrate plus wash water is heated to boiling, Norit is added, and the hot solution is filtered. The volume of the solution is adjusted to 400 ml. by either the addition of an appropriate amount of water or by evaporation.

The cystine and tyrosine are separated from one another, and the tyrosine converted to tyrosine ethyl ester hydrochloride, in accordance with the procedure of Example I. A yield of pure L-tyrosine ethyl ester hydrochloride of about 2.8 grams is obtained.

Aspartic acid is separated from the combined ion exchange resin portions in the same manner as specified in Example I. A yield of L-aspartic acid of approximately 5.5 grams is obtained. This yield is converted to the sodium salt thereof by dissolution in 50 ml. of water containing 1.6 grams of sodium hydroxide.

The 400 ml. main solution containing the majority of the amino acids is heated to about 90° C. The solution is stirred during the addition of the sodium L-aspartate solution, the addition of the 2.8 grams of L-tyrosine ethyl ester hydrochloride and the addition of 1.2 grams of pure L-methionine. After the dissolution is complete, the heat is removed from the solution, and glucose is added in the same amounts and at the same rate as in Example I. The temperature of the solution reaches 40° C. in about ten minutes. After the dissolution of glucose is completed, 0.84 gram of L-tryptophan is dissolved in the solution. Following the dissolution of the tryptophan, 4.8 grams of L-glutamine is dissolved.

Analysis of the solution shows that the amino acid composition thereof is as follows: L-tryptophan, 0.84 gram; L-threonine, 3.2 grams; L-isoleucine, 3.6 grams; L-leucine, 7.3 grams; L-lysine, 5.4 grams; L-methionine, 2.6 grams; L-phenylalanine, 2.6 grams; L-tyrosine ethyl ester hydrochloride, 2.8 grams; L-valine, 3.4 grams; L-arginine, 2.1 grams; L-histidine, 1.2 grams; L-alanine, 3.7 grams; L-aspartic acid, 5.5 grams; L-glutamine, 4.8 grams; L-proline, 2.5 grams and L-serine, 2.5 grams.

This analysis shows that a substantially quantitative recovery of most of the amino acids present in the sixty grams of lactalbumin hydrolysate is obtained in the final solution, with the exception of cystine, glutamic acid and tryptophan. The solution has a relatively clear color and has the characteristically sweet taste of glucose but is clearly palatable to the human taste. The amino acid-glucose solution is considered to be well-suited for inclusion as a portion of a defined diet or chemically defined diet.

EXAMPLE III

Sixty grams of purified soybean protein hydrolysate (enzymatically hydrolyzed) is treated in substantially exactly the same manner as the lactalbumin hydrolysate of Example II.

Pure L-tyrosine ethyl ester hydrochloride, in an amount of about 2.3 grams, is recovered from the cystine-tyrosine precipitate. Approximately 6.5 grams of L-aspartic acid is recovered from the combined ion exchange resin portions, and this amount is converted to the sodium salt thereof by dissolution in 60 ml. of water in which 1.9 grams of sodium hydroxide is dissolved.

The sodium L-aspartate solution and the L-tyrosine ethyl ester hydrochloride are added to the main solution in exactly the same manner as in Example II. About 1.1 grams of purified L-methionine is added while the solution is at about 90° C. Cooling by addition of glucose is carried out in exactly the same manner as in Example II. After all of the glucose is dissolved and the temperature of the solution is below 40° C., 0.34 gram of L-tryptophan is dissolved, followed by 5.0 grams of L-glutamine.

Analysis of the solution shows that the amino acid composition thereof is as follows: L-tryptophan 0.84 gram, L-threonine 2.3 grams, L-isoleucine 3.1 grams, L-leucine 4.5 grams, L-lysine 3.7 grams, L-methionine 2.6 grams, L-phenylalanine 2.9 grams, L-tyrosine ethyl ester hydrochloride 2.3 grams, L-valine 3.1 grams, L-arginine 4.2 grams, L-histidine 1.4 grams, L-alanine 2.4 grams, L-aspartic acid 6.5 grams, L-glutamine 5.0 grams, glycine 2.5 grams, L-proline 3.9 grams, L-serine 3.8 grams.

The above analysis shows that a subtantially quantitative recovery of most of the amino acids from the 60 grams of soybean protein hydrolystate is obtained, with the exception of cystine, glutamic acid, and tryptophan. The solution is relatively clear in color, and tasting shows that it has a fairly sweet taste characteristic of high glucose content, but is clearly palatable to human taste. The amino acid-glucose formulation is considered well-suited for combination together with additional carbohydrate, vitamins, minerals and fat to provide a diet composition containing all the necessary nutritional requirements for the human species.

EXAMPLE IV

Fifty grams of gelatin (86% protein) are suspended in 300 milliliters of concentrated hydrochloric acid in a glass bottle, and the bottle is placed in an autoclave for about five hours at about 120° C. The resultant hydrolysate is concentrated to a thick syrup under reduced pressure, and the excess ·HCl is removed by evaporation twice, after the addition each time of about 75 milliliters of water. The final residue is dissolved in 150 ml. of hot distilled water, treated with Norit and then filtered while hot. The filtrate is evaporated in vacuo to a thick syrup. Then the filtrate is evaporated to dryness under about one-half atmosphere pressure, and the residue is dissolved in water. Because gelatin contains only minor amounts of cystine and tyrosine, removal of these two amino acids is not effected.

Pre-treated Amberlite IRA resin (a strong base-type anion exchange resin) is added, while stirring, until the pH of the solution reaches about 6.5. The Amberlite IRA resin is pre-treated successively with ·HCl, water, sodium carbonate, and water again. The resin is filtered from the solution, and the filtrate acidified using hydrochloric acid to a pH of about 2.8. The acidified filtrate is again treated with a sufficient fresh resin to bring the pH to about 6.5. The resin is again filtered from the solution, and the two resin portions are combined. The aspartic acid and the glutamic acid are absorbed onto the resin.

The filtrate is heated to boiling, Norit is added, and the solution is filtered while hot. The volume of the solution is adjusted to 400 milliliters by either the addition of an appropriate amount of water or by evaporation. This solution contains the following amino acids from the protein: threonine, isoleucine, leucine, lysine, cystine, methionine, phenylalanine, valine, arginine, histidine, alanine, glycine, proline, tyrosine and serine.

The combined ion exchange resin portions are extracted with 1.0 N ·HCl until the pH of the extract is less than 2. The extracts are treated with Norit, filtered and evaporated to a low bulk. The solution is then saturated with dry hydrogen chloride gas, and chilled to a temperature of about 0° C. whereat the glutamic acid precipitates in the form of L-glutamic acid ·HCl. The filtrate from these crystals is evaporated in vacuo to a syrup to remove excess hydrochloric acid, diluted with water and then boiled. It is then treated with an excess of copper carbonate, and the excess is filtered while the solution is still hot. Upon cooling to room temperature, the blue copper salt of L-aspartic acid crystallizes in substantially quantitative yield. This salt is then suspended in water and treated with hydrogen sulfide gas. The resultant copper sulfide is filtered from the solution with the aid of Norit, and the filtrate is evaporated to a low bulk. Ethanol in an amount about four times the volume of the solution is added, which causes the precipitation of L-aspartic acid. A yield of approximately 2.9 grams of L-aspartic acid is obtained, which is then converted to the sodium salt thereof by dissolution in 30 ml. of distilled water containing 0.9 gram of sodium hydroxide.

The 400 ml. volume main solution containing the majority of amino acids is heated to about 70° C. Successively added thereto are the sodium L-aspartate solution, 3.7 grams of L-tyrosine ethyl ester hydrochloride (to raise the low tyrosine content), 2.2 grams of pure L-methionine (to supplement the low cystine content), plus 1.3 grams of L-threonine, 2.8 grams of L-isoleucine, 3.8 grams of L-leucine, 2.1 grams of L-lysine, 1.9 grams of L-phenylalanine, 2.7 grams of L-valine and 1.2 grams of L-histidine (to supplement the low content of these essential amino acids), stirring being employed continuously to facilitate dissolution.

The heat is removed and the solution is rapidly cooled to 40° C. or below by the addition of about 400 grams of glucose, in increments of about 50 grams each, using continuous stirring to facilitate dissolution. Under these conditions, the temperature reaches 40° C. about ten minutes subsequent to the initial addition of glucose. Upon dissolution of all of the glucose, 0.84 gram of L-tryptophan is added. Subsequent to complete dissolution of the tryptophan, 6.1 grams of L-glutamine are dissolved in the solution.

Analysis of the solution shows that amino acids are contained therein in approximately the following amounts: L-tryptophan 0.84 g., L-threonine 2.3 g., L-isoleucine 3.5 g., L-leucine 5.3 g., L-lysine 4.2 g., L-methionine 2.6 g., L-cystine 0.08 g., L-phenylalanine 2.9 g., L-tyrosine 0.4 g., L-tyrosine ethyl ester hydrochloride 3.7 g., L-valine 3.9 g., L-arginine 3.9 g., L-aspartic acid 2.9 g., L-glutamine 6.1 g., L-histidine 1.6 g., L-alanine 4.2 g., glycine 11.4 g., L-proline 6.9 g., and L-serine 1.8 g.

The above analysis shows that substantially quantitative yields of most of the amino acids are obtained from the 50 grams of gelatin (86% protein) that were hydrolyzed, with the exception of glutamic acid which was removed. The solution is fairly clear, and tasting shows that although it exhibits a relatively sweet taste characteristic of the glucose, it is clearly palatable to the human taste. The formulation is considered to be excellently suited to provide a complete chemical nutrient composition for the human species by the addition to the solution of additional carbohydrate and appropriate amounts of vitamins, minerals and essential fat.

EXAMPLE V

Sixty grams of casein is hydrolyzed with concentrated hydrochloric acid and the cystine, tyrosine, glutamic acid, and aspartic acid are removed from the acid hydrolysate using the procedure set forth in Example I. Treatment is similarly carried out to separate the glutamic acid and to convert the aspartic acid to its sodium salt. The sodium L-aspartate solution is added to the main protein hydrolysate solution. The L-tyrosine ethyl ester hydrochloride is formed in substantially the same manner as in Example I. The main protein hydrolysate solution is taken to dryness of evaporation, yielding a dry mixture of amino acids. 400 grams of glucose, 0.84 gram of L-tryptophan, 1.0 gram of L-methionine, and the 3.7 grams of L-tyrosine ethyl ester ·HCl, are blended with the dry mixture to produce a composite formulation. Analysis of the dry formulation shows that amino acids are contained therein in substantially exactly the same amounts as are contained in the final solution provided in Example I. This dry formulation, when dissolved in water, gives a solution that is fairly clear; and tasting shows that, although it exhibits a relatively sweet taste characteristic of the glucose, it is definitely palatable to the human taste. The formulation is considered to be excellently suited to provide a complete chemical nutrient composition for the human species by the addition of additional carbohydrate and appropriate amounts of vitamins, minerals and fat.

EXAMPLE VI

Sixty grams of lactalbumin hydrolysate (acid hydrolyzed) is treated in substantially exactly the same manner as the lactalbumin hydrolysate of Example II to effect the removal of cystine, tyrosine, aspartic acid and glutamic acid. The separation and conversion of the tyrosine and aspartic acid are also similarly performed. To this main solution is added the resultant sodium aspartate solution and the 2.8 grams of L-tyrosine ethyl ester hydrochloride, plus 1.2 grams of L-methionine. The main hydrolysate solution is then taken to dryness by evaporation, and to the resultant dry mixture of amino acids is blended 0.84 gram of L-tryptophan, 4.8 grams of L-glutamine and 400 grams of glucose. Analysis of the composite formulation shows that the amino acid composition of the dry mixture is substantially exactly the same as the aqueous amino acid formulation produced in Example II. The dry formulation is readily soluble in water to give a solution that is clear in color and has the characteristically sweet taste of glucose, but which is clearly patatable to the human taste. The amino acid-glucose mixture is considered to be well-suited for inclusion as a portion of a defined diet or chemically defined diet.

EXAMPLE VII

Fifty grams of gelatin (86% protein) are hydrolyzed with hydrochloric acid and the glutamic acid and aspartic acid components removed from the acid hydrolysate in substantially exactly the same manner as from the gelatin hydrolysate of Example IV. The aspartic acid is separated from the glutamic acid and converted to a sodium aspartate solution using the procedure specified in Example I. This solution is added to the main hydrolysate solution which is then evaporated to dryness to give a dry mixture containing the following amino acids: threonine, isoleucine, leucine, lysine, cystine, methionine, phenylalanine, valine, arginine, aspartic acid, histidine, alanine, glycine, propline, tyrosine and serine. Into this mixture are blended 3.7 grams of L-tyrosine ethyl ester hydrochloride, 2.2 grams of pure L-methionine, 1.3 grams of L-threonine, 2.8 grams of L-isoleucine, 3.8 grams of L-leucine, 2.1 grams of L-lysine, 1.9 grams of L-phenylalanine, 2.7 grams of L-valine, 1.2 grams of L-histidine and 400 grams of glucose. Analysis of the dry mixture shows that the amino acids are contained therein in substantially the same amounts as are contained in the final solution produced in Example IV. The resultant dry formulation upon dissolution in water yields a solution that is fairly clear, and tasting shows that, although it exhibits a relatively sweet taste characteristic of the glucose, it is clearly palatable to the human taste. The formulation is considered to be excellently suited to provide a complete nutrient composition for the human species by the addition thereto of additional carbohydrate and appropriate amounts of vitamins, minerals and essential fat.

In general, the present invention provides processes for the production, primarily from relatively abundant protein hydrolysates, of aqueous solutions and dry mixtures including all of the essential amino acids plus non-essential amino acids in quantities balanced to fulfill the nutritional requirements of the human species, which solutions and dry mixtures are palatable to human taste and which, by virtue of their relatively simple biochemical nature, are able to bypass virtually all digestive functions. Modifications as would be obvious to one having the ordinary skill in the art may be made without deviating from the principles and spirit of the invention. For example, other suitable methods for removal of the aforementioned amino acids may be used as well as those preferred methods enumerated herein.

Various of the features of the invention are set forth in the following claims.

What is claimed is:

1. A process for forming a palatable amino acid nutrient composition for human consumption, which process comprises forming an aqueous solution of protein hydrolysate containing essential and nonessential amino acids including methionine, glutamic acid and cystine, removing substantially all of the glutamic acid and cystine from said protein hydrolysate solution and treating said aqueous protein hydrolysate solution to remove lower alkyl mercaptans, thereby removing protential taste offenders, and adding amino acids including L-tryptophan in amount sufficient to provide nutritional balance in said protein hydrolysate whereby a palatable amino acid nutrient composition is provided which in aqueous solution contains lower alkyl mercaptans in an amount not greater than 15 mg. per liter, contains sulfhydryl groups in an amount not greater than 0.05 gram per liter and contains glutamic acid in an amount not greater than about 1.43 grams per liter.

2. A process in accordance with claim 1 wherein L-glutamine is added to said protein hydrolysate in amounts to provide nutritional balance in said protein hydrolysate.

3. A process in accordance with claim 1 wherein said hydrolysate also includes aspartic acid and said glutamic acid is removed from said solution concurrently with said aspartic acid.

4. A process in accordance with claim 3 wherein said removed aspartic acid is separated from said glutamic acid and converted to a water-soluble salt thereof, and wherein said converted water-soluble salt of aspartic acid is returned to said protein hydrolysate.

5. A process in accordance with claim 3 wherein glutamic acid and aspartic acid are concurrently removed from said solution by adsorption onto anion exchange resins.

6. A process in accordance with claim 1 wherein purified L-methionine is subsequently added to said protein hydrolysate in at least an amount which is nutritionally equivalent to said cystine removed, said purified L-methionine not containing lower alkyl mercaptans in an amount whereby they would be present in the ultimate palatable composition in an amount greater than about 15 mg. per liter of aqueous solution.

7. A process in accordance with claim 6 wherein said hydrolysate also includes tyrosine and said tyrosine is removed from said protein hydrolysate solution concurrently with said cystine.

8. A process in accordance with claim 7 wherein said tyrosine is separated from said cystine, converted to a water-soluble salt, and returned to said protein hydrolysate.

9. A process in accordance with claim 8 wherein said aqueous protein hydrolysate solution is dried subsequent to the removal of said glutamic acid, said cystine and said tyrosine, and wherein said water-soluble tyrosine salt is blended with said dried protein hydrolysate.

10. A process in accordance with claim 7 wherein cystine and tyrosine are concurrently removed from said solution by precipitation at a pH between about 5 to 7 and a temperature below about 5° C.

11. A process in accordance with claim 7 wherein said tyrosine is separated from said cystine by dissolution of both into a hot aqueous ammonium hydroxide solution, followed by precipitation of said tyrosine at a temperature of about 10° C. or below.

12. A process in accordance with claim 11 wherein said tyrosine precipitate is suspended in ethanol, treated with gaseous HCl to form tyrosine ethyl ester hydrochloride and evaporated until dryness before being returned to said protein hydrolysate.

13. A process in accordance with claim 1 wherein said aqueous protein hydrolysate solution is made from a protein selected from the group consisting of casein, gelatin, lactalbumin and soybean protein.

14. A process in accordance with claim 9 wherein said protein hydrolysate is an acid hydrolysate of casein, and wherein said methionine plus L-tryptophan plus L-glutamine are dry-blended with said dried protein hydrolysate to produce a product which is soluble in water.

15. A process for forming a palatable amino acid nutrient composition for human consumption, which process comprises forming an aqueous solution of protein hydrolysate containing essential and nonessential amino acids including methionine, glutamic acid, aspartic acid, cystine and tyrosine, removing cystine and tyrosine concurrently from said solution, cystine being a potential taste offender, separating said tyrosine from said cystine and converting said tyrosine to a water-soluble salt thereof, removing glutamic acid and aspartic acid concurrently from said solution, glutamic acid being a potential taste offender, separating said removed aspartic acid from said glutamic acid and converting said aspartic acid to a water-soluble salt thereof, and treating said aqueous protein hydrolysate solution to remove lower alkyl mercaptans, which are potential taste offenders, and returning said converted water-soluble salts of tyrosine and aspartic acid to said protein hydrolysate to provide a palatable nutrient composition which in aqueous solution contains lower alkyl mercaptans in an amount not greater than 15 mg. per liter, contains sulfhydryl groups in an amount not greater than 0.05 gram per liter and contains glutamic acid in an amount not greater than about 1.43 grams per liter.

16. A process in accordance with claim 15 wherein L-glutamine is added to said aqueous protein hydrolysate solution, in about an amount which is nutritionally equivalent to the amount of said glutamic acid removed, while the temperature thereof is below about 70° C.

17. A process in accordance with claim 16 wherein L-tryptophan is also added to said solution while the temperature thereof is below about 70° C.

18. A process in accordance with claim 16 wherein purified L-methionine is also added to said solution, in at least an amount which is nutritionally equivalent to said cystine removed, while said protein hydrolysate solution is at a temperature of at least about 70° C., said purified L-methionine not containing lower alkyl mercaptans in an amount whereby they would be present in the ultimate palatable composition in an amount greater than about 15 mg. per liter of aqueous solution and wherein said temperature is lowered to below about 40° C. before the addition of said glutamine.

19. A process in accordance with claim 18 wherein said temperature is lowered from at least about 70° C. to below about 40° C. in ten minutes by sufficiently rapid dissolution of a carbohydrate.

20. A process for forming a palatable amino acid nutrient composition for human consumption, which process comprises forming an aqueous solution of protein hydrolysate containing essential and nonessential amino acids including methionine and glutamic acid, removing glutamic acid which is a potential taste offender from said protein hydrolysate solution and treating said aqueous protein hydrolysate solution to remove lower alkyl mercaptans which are potential taste offenders, and adding amino acids including L-tryptophan to said protein hydrolysate in amounts to provide nutritional balance in said protein hydrolysate whereby a palatable amino acid nutrient composition is provided which in aqueous solution contains lower alkyl mercaptans in an amount not greater than 15 mg. per liter, contains sulfhydryl groups in an amount not greater than 0.05 gram per liter and contains glutamic acid in an amount not greater than about 1.43 grams per liter.

21. A process in accordance with claim 20 wherein said hydrolysate also includes aspartic acid and said glutamic acid is removed from said solution concurrently with said aspartic acid and wherein glutamine and a water-soluble salt of aspartic acid are added to said protein hydrolysate to provide a palatable nutritionally balanced composition.

22. A process in accordance with claim 21 wherein said removed aspartic acid is separated from said glutamic acid and converted to a water-soluble salt thereof, and wherein said converted water-soluble salt of aspartic acid is returned to said protein hydrolysate.

23. A process in accordance with claim 22 wherein glutamic acid and aspartic acid are concurrently removed from said solution by adsorption onto anion exchange resins.

References Cited

UNITED STATES PATENTS

| | | | |
|---|---|---|---|
| 3,030,380 | 4/1962 | Weygand et al. | 260—326.3 |
| 3,080,234 | 3/1963 | Jarowski | 99—14 |

OTHER REFERENCES

Greenstein et al.: Archives of Biochemistry and Biophysics, volume 72, 1957, pp. 396–416.

Greenstein et al.: Chemistry of the Amino Acids, John Wiley and Sons, Inc., New York, 1961, pp. 258–266, 1856–1865, 1880–1889.

Elman: Annals of Surgery, October 1940, pp. 594–596, 602.

RAYMOND N. JONES, Primary Examiner

R. B. ANDEWELT, Assistant Examiner

U.S. Cl. X.R.

99—1, 28; 260—112; 424—319